US010713541B2

(12) United States Patent
Jin et al.

(10) Patent No.: US 10,713,541 B2
(45) Date of Patent: Jul. 14, 2020

(54) SYSTEMS AND METHODS FOR OCCLUSION HANDLING IN A NEURAL NETWORK VIA ACTIVATION SUBTRACTION

(71) Applicant: Johnson Controls Technology Company, Auburn Hills, MI (US)

(72) Inventors: ZhongYi Jin, Santa Clara, CA (US); Young M. Lee, Old Westbury, NY (US); Youngchoon Park, Brookfield, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 120 days.

(21) Appl. No.: 16/125,994

(22) Filed: Sep. 10, 2018

(65) Prior Publication Data

US 2020/0082206 A1     Mar. 12, 2020

(51) Int. Cl.
*G06K 9/62*     (2006.01)
*G06N 3/08*     (2006.01)

(52) U.S. Cl.
CPC ............. *G06K 9/628* (2013.01); *G06K 9/627* (2013.01); *G06N 3/08* (2013.01)

(58) Field of Classification Search
CPC ....... G06T 7/0069; G06T 7/262; G06T 7/751; G06T 7/579; G06T 7/50; G06T 5/005; G06T 5/50; G06T 7/20; G06T 7/74; G06T 7/246; G06T 7/277; G06T 7/75; G06T 7/251; G06T 7/248; H04N 13/117; H04N 19/553; H04N 13/00; H04N 19/00; G06K 9/00335; G06K 9/00664; G06K 9/3233; G06K 9/4628; G06K 9/6274; G06K 9/66

See application file for complete search history.

(56) References Cited

U.S. PATENT DOCUMENTS

2017/0140253 A1*    5/2017   Wshah .................... G06N 3/08

OTHER PUBLICATIONS

Chandel et al., Occlusion Detection and Handling: A Review, International Journal of Computer Applications, Jun. 2015, 7 pages.
Chandler et al., Mitigation of Effects of Occlusion on Object Recognition with Deep Neural Networks through Low-Level Image Completion: Computational Intelligence and Neuroscience, 2016, 16 pages.

\* cited by examiner

*Primary Examiner* — Duy M Dang
(74) *Attorney, Agent, or Firm* — Foley & Lardner LLP

(57) ABSTRACT

A method for classifying an occluded object includes receiving, by one or more processing circuits, an image of the object that is partially occluded by a foreign object and classifying, by the one or more processing circuits, the object of the image into one of one or more classes of interest via an artificial neural network (ANN) by determining a plurality of neuron activations of neurons of the ANN for one or more foreign classes and the one or more classes of interest, subtracting one or more of the neuron activations of the one or more foreign classes from the neuron activations of the one or more classes of interest, wherein the foreign object belongs to one of the one or more foreign classes, and classifying the object of the image into the one of the one or more classes of interest based on the subtracting.

20 Claims, 10 Drawing Sheets

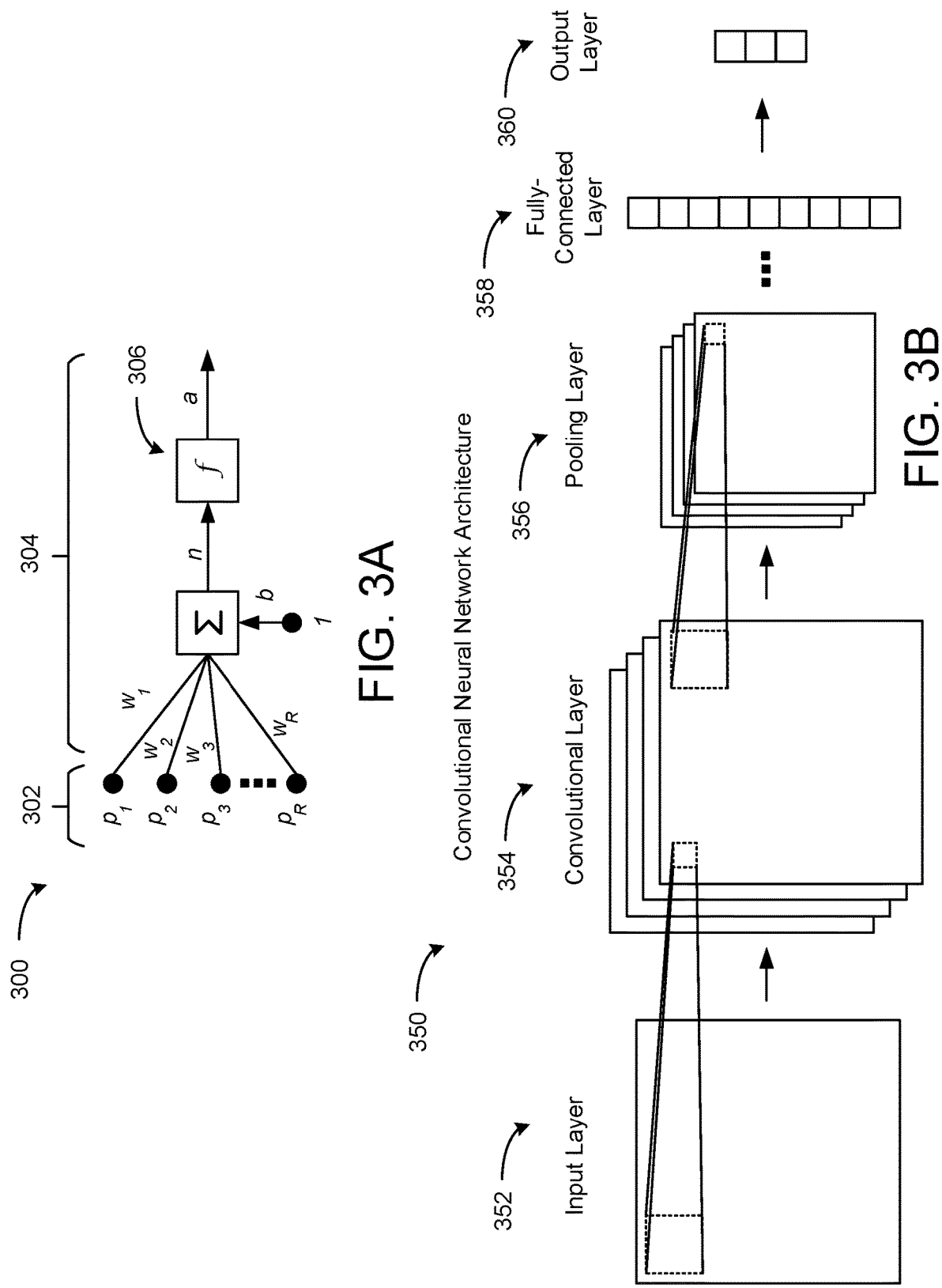

SYSTEMS AND METHODS FOR OCCLUSION HANDLING IN A NEURAL NETWORK VIA ACTIVATION SUBTRACTION

BACKGROUND

The present disclosure relates generally to image-based classification systems. The present disclosure relates more particularly to occlusion handling in image-based classification systems.

In image-based classification systems, such as a convolutional neural network classification system or an artificial neural network system, an object of interest is often partially occluded by some foreign objects. Partial occlusions can introduce noise into the classification process and often results in misclassification of the object of interest. To remedy the misclassification problem created by partial occlusions, some image-based classification systems perform a preliminary step of detecting foreign objects and removing them from the original image before proceeding with the classification process. The added step of identifying and removing foreign objects is computationally expensive and inaccurate. Another solution used in convolutional neural network image-based classification systems involves including various combinations of occlusions in the training dataset through either manually labeling or automatic augmentation. A training dataset including such combinations of occlusions is difficult to construct and not scalable when there are multiple types of foreign objects that might occlude the image.

SUMMARY

One implementation of the present disclosure is a method for classifying an object of an image that is partially occluded by a foreign object. The method includes receiving, by one or more processing circuits, the image of the object that is partially occluded by the foreign object and classifying, by the one or more processing circuits, the object of the image into one of one or more classes of interest via an artificial neural network (ANN) by determining neuron activations of neurons of the ANN for one or more foreign classes and the one or more classes of interest, subtracting one or more of the neuron activations of the one or more foreign classes from the neuron activations of the one or more classes of interest, wherein the foreign object belongs to one of the one or more foreign classes and classifying the object of the image into the one of the one or more classes of interest based on the subtracting.

In some embodiments, determining the neuron activations of the neurons of the ANN for the one or more foreign classes and the one or more classes of interest includes performing, with the image, one or more convolutions via one or more convolutional layers of the ANN, wherein an output of the one or more convolutions is the neuron activations of the neurons of the ANN for the one or more foreign classes and the one or more classes of interest, wherein the ANN is a convolutional neural network (CNN).

In some embodiments, classifying, by the one or more processing circuits, the object of the image into the one of one or more classes of interest via the ANN includes deactivating the neuron activations of the one or more foreign classes.

In some embodiments, classifying, by the one or more processing circuits, the object of the image into the one of the one or more classes of interest via the ANN includes performing a single forward pass of the ANN.

In some embodiments, classifying, by the one or more processing circuits, the object of the image into the one of the one or more of classes of interest via the ANN includes performing the single forward pass of the ANN, pausing the single forward pass after determining the neuron activations of the neurons of the ANN for the one or more foreign classes and the one or more classes of interest, subtracting the one or more of the neuron activations of the one or more foreign classes from the neuron activations of the one or more classes of interest, and resuming the single forward pass to classify the object of the image into the one of the one or more classes of interest.

In some embodiments, subtracting the one or more of the neuron activations of the one or more foreign classes from the neuron activations of the one or more classes of interest includes adjusting at least one particular neuron activation of each of the one or more classes of interest to a value of a maximum of zero and the particular neuron activation minus a summation of the one or more of the neuron activations for the one or more foreign classes.

In some embodiments, the neuron activations of the one or more foreign classes are neuron activations for one or more foreign class feature maps, each of the one or more feature class maps being a foreign class feature map for one of the one or more foreign classes. In some embodiments, the neuron activations of the one or more classes of interest are neuron activations for one or more class of interest feature maps, each of the one or more class of interest feature maps being an class of interest feature map for one of the one or more classes of interest.

In some embodiments, the one or more foreign class feature maps and the one or more object of interest class feature maps are each a matrix of neuron activations of a predefined length and a predefined width. In some embodiments, the summation of the one or more of the neuron activations for the one or more foreign classes are a summation of a neuron activation of each matrix of each of the one or more foreign class feature maps at a particular length value and a particular width value, wherein the particular neuron activation of the class of interest is at the particular length value and the particular width value of one of the class of interest feature maps.

In some embodiments, the method further includes receiving, by the one or more processing circuits, images, wherein the images include images of foreign objects of the one or more foreign classes and images of objects of the one or more classes of interest and training, by the one or more processing circuits, the ANN based on the images of the foreign objects of the one or more foreign classes and the images of the one or more classes of interest.

In some embodiments, the images of the foreign objects of the one or more foreign classes do not include pixels related to the objects of the one or more classes of interest. In some embodiments, the images of the objects of the classes of interest do not include pixels related to the objects of the foreign objects of the one or more foreign classes.

In some embodiments, the foreign classes and the classes of interest include different classes.

Another implementation of the present disclosure is a classification system for classifying an object of an image that is partially occluded by a foreign object. The system includes a processing circuit configured to receive the image of the object that is partially occluded by the foreign object and classify the object of the image into one of one or more classes of interest via an artificial neural network (ANN) by determining neuron activations of neurons of the ANN for one or more foreign classes and the one or more classes of interest, subtracting one or more of the neuron activations of the one or more foreign classes from the neuron activations of the one or more classes of interest, wherein the foreign object belongs to one of the one or more foreign classes, and classifying the object of the image into the one of the one or more classes of interest based on the subtracting.

In some embodiments, the processing circuit is configured to classify the object of the image into the one of one or more classes of interest via the ANN by deactivating the neuron activations of the one or more foreign classes.

In some embodiments, the processing circuit is configured to classify the object of the image into the one of the one or more classes of interest via the ANN by performing a single forward pass of the ANN.

In some embodiments, the processing circuit is configured to classify the object of the image into the one of the one or more of classes of interest via the ANN by pausing the single forward pass after determining the neuron activations of the neurons of the ANN for the one or more foreign classes and the one or more classes of interest, subtracting the one or more of the neuron activations of the one or more foreign classes from the neuron activations of the one or more classes of interest, and resuming the single forward pass to classify the object of the image into the one of the one or more classes of interest.

In some embodiments, subtracting the one or more of the neuron activations of the one or more foreign classes from the neuron activations of the one or more classes of interest includes adjusting at least one particular neuron activation of each of the one or more classes of interest to a value of a maximum of zero and the particular neuron activation minus a summation of the one or more of the neuron activations for the one or more foreign classes.

In some embodiments, the neuron activations of the one or more foreign classes are neuron activations for one or more foreign class feature maps, each of the one or more feature class maps being a foreign class feature map for one of the one or more foreign classes. In some embodiments, the neuron activations of the one or more classes of interest are neuron activations for one or more class of interest feature maps, each of the one or more class of interest feature maps being an class of interest feature map for one of the one or more classes of interest.

In some embodiments, the one or more foreign class feature maps and the one or more object of interest class feature maps are each a matrix of neuron activations of a predefined length and a predefined width. In some embodiments, the summation of the one or more of the neuron activations for the one or more foreign classes are a summation of a neuron activation of each matrix of each of the one or more foreign class feature maps at a particular length value and a particular width value, wherein the particular neuron activation of the class of interest is at the particular length value and the particular width value of one of the class of interest feature maps.

Another implementation of the present disclosure is a device for training an artificial neural network (ANN) and classifying an object of an image that is partially occluded by a foreign object with the trained ANN. The device includes a processing circuit configured to receive images, wherein the images include images of foreign objects of one or more foreign classes and images of objects of one or more classes of interest, train the ANN based on the images of the foreign objects of the one or more foreign classes and the images of the one or more classes of interest, and receive, the image of the object that is partially occluded by the foreign object. The processing circuit is configured to classify the object of the image into one of one or more classes of interest via the ANN by determining neuron activations of neurons of the ANN for one or more foreign classes and the one or more classes of interest, subtracting one or more of the neuron activations of the one or more foreign classes from the neuron activations of the one or more classes of interest, wherein the foreign object belongs to one of the one or more foreign classes, and classifying the object of the image into the one of the one or more classes of interest based on the subtracting.

In some embodiments, the images of the foreign objects of the one or more foreign classes do not include pixels related to the objects of the one or more classes of interest. In some embodiments, the images of the objects of the classes of interest do not include pixels related to the objects of the foreign objects of the one or more foreign classes.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 3A is a block diagram of a neuron that can exist in the classification model of FIG. 2, according to an exemplary embodiment.

FIG. 3B is a block diagram of a convolutional neural network with a convolutional layer, a pooling layer, and a fully connected layer according to an exemplary embodiment.

DETAILED DESCRIPTION

Overview

Figure 1:
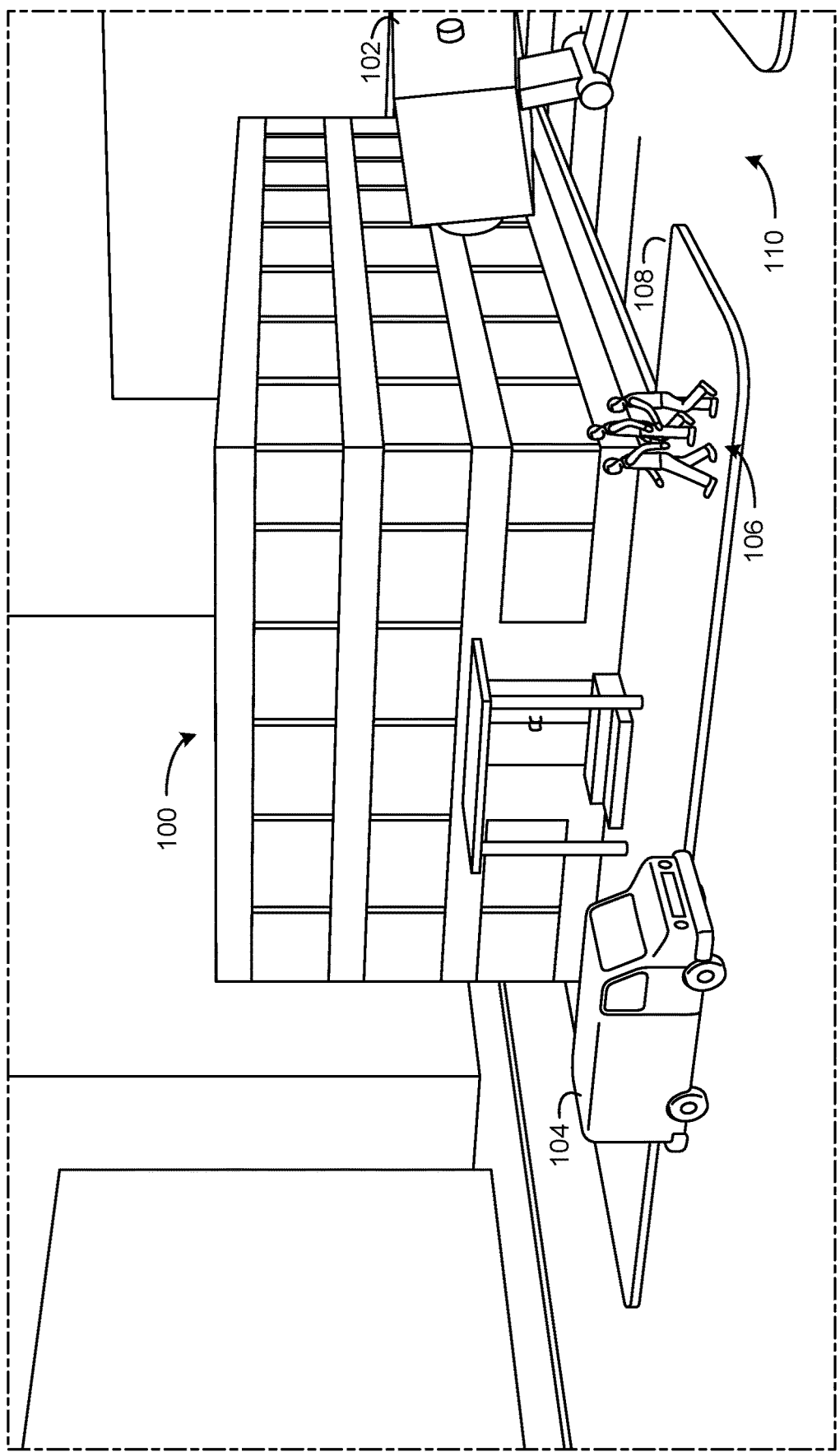
FIG. 1 is a drawing of a building with a security camera system and a parking lot, according to an exemplary embodiment.

Referring generally to the FIGURES, an efficient occlusion handling method and system for the classification of image-based objects using convolutional neural networks is shown, according to various exemplary embodiments. The present disclosure relates to an efficient occlusion handling system designed to reduce computational expense and increase accuracy of the image-based classification system. This efficient occlusion-handling system identifies the activation levels of neurons associated with foreign objects and removes those activations within the convolutional neural network. The removal of foreign object neuron activations is completed with an activation region subtractor that operates within the convolutional neural network.

The activation region subtractor is configured to receive input from a final convolutional layer of the convolutional neural network in the form of neuron activations. The activation subtractor can be configured to remove the neuron activations associated with foreign classes from neuron activations associated with the class of interest. The output of the activation region subtractor is then processed by a pooling layer of the convolutional neural network before a probability output is finally generated, the probability output classifying the image for use in various applications (e.g. security systems, autonomous driving systems, etc.).

Unlike other occlusion handling systems, which may perform a first step of identifying foreign objects and removing them from the image before completing the classification process using a convolutional neural network, the present invention handles occlusions within the convolutional neural network computation via the activation subtractor. Because the activation region subtraction occurs within the convolutional neural network, the image-based classification system can complete the image classification process in only one forward pass, rather than performing a multi-step classification process. By removing the occlusions in one forward pass of a convolutional neural network, the image-based classification system is computationally efficient, allowing for classification of partially-occluded objects with low-power processing devices, Advanced Reduced Instruction Set Computer (RISC) Machine (ARM) processors, for example.

The activation region subtractor is created by using a set of known foreign objects, j, and set of known objects of interest, k, to create training models for each object type separately. The training dataset is used in a convolutional neural network architecture with j+k output classes $\{I_1, I_2, \ldots, I_k, F_1, F_2, \ldots, F_j\}$ where I indicates the type of object of interest and F indicates the type of foreign object.

The last convolutional layer of the convolutional neural network, layer L-2 ("layer L minus two"), is designed to be of size (k+j)×h×w where h and w are constants. Furthermore, the layer directly before the final output layer is designed to be of size (k+j)×1×1. Each tensor from layer L-2 of size h×w is then mapped to one tensor of size 1×1 in layer L-1 ("layer L minus 1"). In mapping from layer L-2 to layer L-1, a pooling operation such as Global Average Pooling (GAP) may be used. To maintain spatial information from original input images, the convolutional neural network architecture may be developed with only convolutional layers and without any fully-connected layers. Layer L-1 is further mapped to one probability at the final output layer using a classifier such as Softmax, for example. A tensor may be a data object, e.g., a data structure that is, or defines, one or more vectors and/or matrices (e.g., one dimensional data objects, two dimensional data objects, three dimensional data objects, etc.).

Using the training dataset with k objects of interest and j foreign objects, the convolutional neural network having layers L-2 and L-1 as described above is trained using a training algorithm (e.g., gradient descent, conjugate gradient, Levenberg Marquardt, etc.). The trained convolutional neural network model can include an activation region that can operate during image classification to handle occlusions. This activation subtractor is configured to deactivate the activation level for activations of classes of interest $\{I_1, I_2, \ldots, I_j\}$ based on activations caused by foreign object classes, $\{F_1, F_2, \ldots, F_j\}$. Operating the activation subtractor can include stopping the forward pass of the convolutional neural network at layer L-2. The activation region subtraction method can be configured to create a matrix N of size h×w to represent the sum total of activation levels associated with foreign object output classes defined as:

$$N = \Sigma_{x=1}^{j}(F_x(h \times w))$$

The activation region subtractor can be configured to deactivate the activation levels of all activations caused by foreign object output classes according to the formula:

$$F_x(h \times w) = -\infty \text{ for } x \text{ from 1 to } j$$

By setting the activation levels of $F_x$ to negative infinity at layer L-2, the activations levels associated with the foreign object classes will no longer influence the image classification in the final output layer.

The activation region subtraction method then adjusts the activation levels of the activations classes of objects of interest based on matrix N:

$$I_x(h \times w) = \max(0, I_x(h \times w) - N) \text{ for } x \text{ from 1 to } k$$

The activation region subtractor can be configured to adjust the activation level for feature maps of classes of objects of interest based on the presence of foreign object classes so as to prevent the image classification model from incorrectly classifying an object as an object of interest when the activation levels for foreign objects, represented by matrix N, suggests that the presence of one or more foreign objects is more likely than the presence of an object of interest.

The convolutional neural network can be configured to proceed with the forward pass through layer L-1 and to the final output layer in response to the activation subtractor adjusting the activation levels for all object of interest classes. Without the occlusion handing method described above, a convolutional neural network might classify an image as indicating that snow is present in the parking lot when in fact there is no snow, but merely a white car in the parking lot. With the occlusion handling method implemented, the same image of a parking lot including a white car is correctly classified by the convolutional neural network as being a parking lot with no snow present. Similarly, a parking lot with snow has been correctly identified by a convolutional neural network using the occlusion handling method despite the presence of a car in the parking lot.

The occlusion handling systems and methods as described herein provide accurate image classification in a computationally-efficient manner despite the presence of occlusions by one or more foreign objects. Moreover, the occlusion handling method can be applied to any occlusion handling situation (e.g., any type of classes) and is scalable to include multiple foreign objects that might occlude an image.

Occlusion Handling

Referring now to FIG. 1, a building 100 with a security camera 102 and a parking lot 110 is shown, according to an exemplary embodiment. The building 100 is a multi-story commercial building surrounded by the parking lot 110 but can be any type of building in some embodiments. The building 100 may be a school, a hospital, a place of business, a residence, an apartment complex, etc. The building 100 may be associated with the parking lot 110.

Both the building 100 and the parking lot 110 are at least partially in the field of view of the security camera 102. In some embodiments, a multiple security cameras 102 may be used to capture the entire building 100 and parking lot 110 not in (or in to create multiple angles of overlapping or the same field of view) the field of view of a single security camera 102. The parking lot 110 may be used by one or more vehicles 104 where the vehicles 104 may be either stationary or moving (e.g. delivery vehicles). The building 100 and parking lot 110 may be further used by one or more pedestrians 106 who can traverse the parking lot 110 and/or enter and/or exit the building 100. The building 100 may be further surrounded by a sidewalk 108 to facilitate the foot traffic of one or more pedestrians 106, facilitate deliveries, etc. In other embodiments, the building 100 may be one of many buildings belonging to a single industrial park or commercial park having a common parking lot and security camera 102. In another embodiment, the building 100 may be a residential building or multiple residential buildings that share a common roadway or parking lot.

In some embodiments, the security camera 102 is installed for purposes of monitoring a parking lot 110 and/or sidewalk 108 for accumulated snow. For example, the security camera may be configured to communicate with an image analysis device (e.g., convolutional neural network) to determine if the parking lot 110 or sidewalk 108 are covered with snow and accordingly require snow removal services. In such embodiments, vehicles 104 and/or pedestrians 106 could partially occlude the parking lot 110 or sidewalk 108. When the parking lot 110 and sidewalk 108 are partially occluded, it is possible that an image analysis system could inaccurately classify the parking lot 110 or sidewalk 108 as being covered in snow. In such embodiments, an occlusion handling system could be implemented to provide more accurate implementation of the security camera 102.

In other embodiments, the security camera 102 is configured to use an image analysis system to observe the parking lot 110 for the purpose of determining how many parking spaces are open and/or occupied. In these embodiments, pedestrians 106, snow, or some other foreign object could partially occlude the parking spaces. In other embodiments, the security camera 102 could be configured to observe the entrance(s) and/or exit(s) of building 100 for the purposes of counting the number of pedestrians 106 enter or exit the building. In this embodiments, for example, vehicles 104 might partially occlude the entrance(s) and/or exit(s) of the building 100. In such embodiments, an occlusion handling system could be implemented to provide more accurate implementation of the security camera 102.

Figure 2:
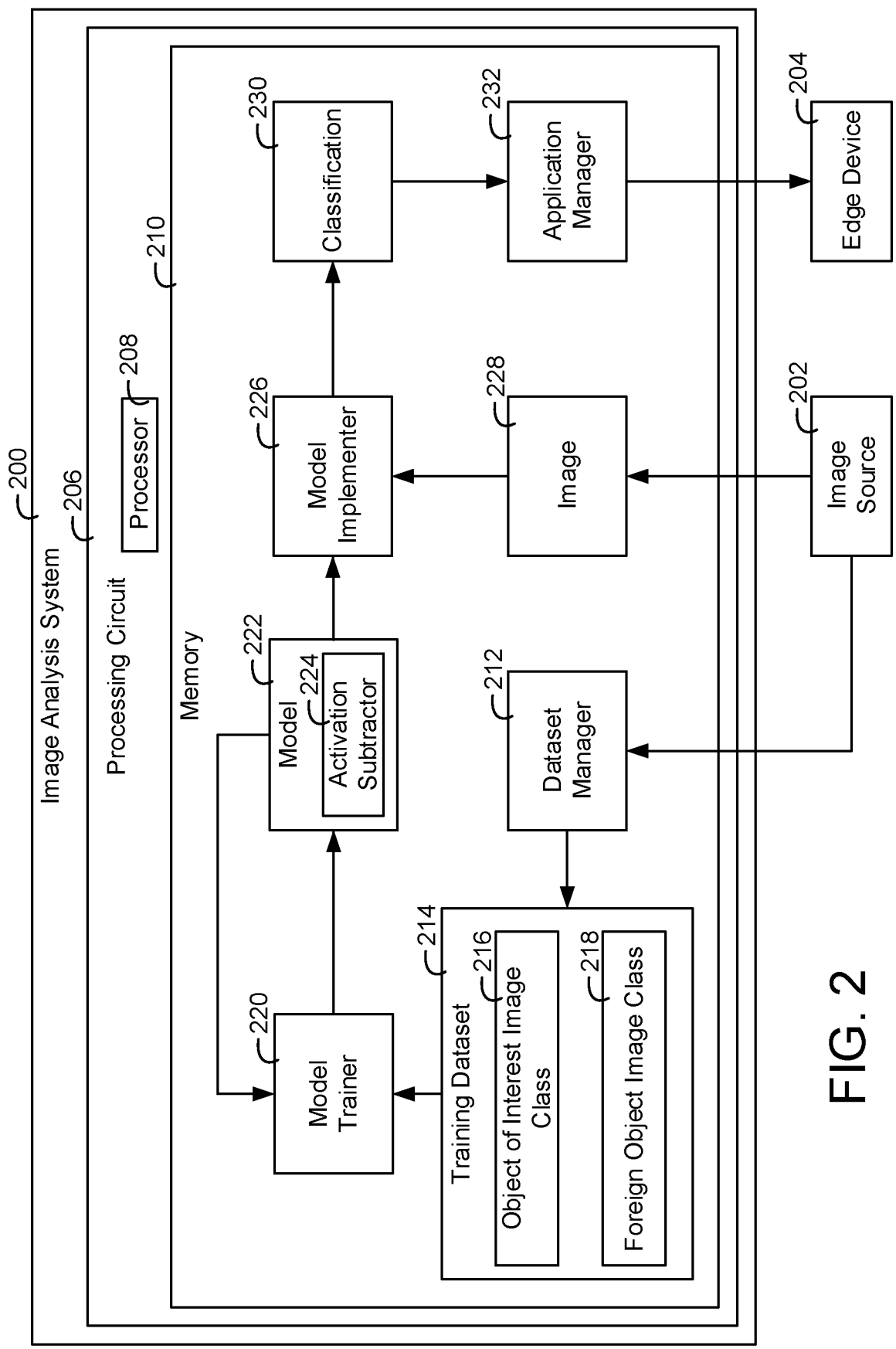
FIG. 2 is a block diagram of an image analysis system for training and executing an image classification model with an activation subtractor for occlusion handling, according to an exemplary embodiment.

Referring now to FIG. 2, a block diagram of an image analysis system 200 for training and executing an image classification model 222 with an activation subtractor 224 is shown, according to an exemplary embodiment. The image analysis system 200 can be implemented as part of a security system of the building 100 as described with reference to FIG. 1, as part of the vehicle 104 as described with reference to FIG. 1, etc.

The image analysis system 200 is shown to include a processing circuit 206 including a processor 208 and a memory 210. In some embodiments, the system 200 includes one or more processing circuits the same as and/or similar to the processing circuit 206. The processor 208 can be implemented as a general purpose processor, an ARM processor, an application specific integrated circuit (ASIC), one or more field programmable gate arrays (FPGAs), a group of processing components, or other suitable electronic processing components. The memory 210 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 210 can be or include volatile memory and/or non-volatile memory.

The memory 210 can include object code components, script components, or any other type of information structure for supporting the various activities and information structures described in the present application. According to some embodiments, the memory 210 is communicably connected to the processor 208 via the processing circuit 206 and can include computer code for executing (e.g., by the processing circuit 206 and/or the processor 208) one or more processes of functionality described herein.

In some embodiments, the image analysis system 200 can be configured to be implemented by cloud computing system. The cloud computing system can be one or more controllers, servers, and/or any other computing device that can be located remotely and/or connected to the systems of building 100 via networks (e.g., the Internet). In some embodiments, the cloud platform can be one or a combination of MICROSOFT AZURE®, or AMAZON WEB SERVICES (AWS)®, a web server, a server farm, a private computing cloud, and/or a public computing cloud.

FIG. 2 includes an image source 202, the image source 202 is configured to provide a set of images to a dataset manager 212 in some embodiments. The image source 202 can be a computing system, database, and/or server system, that can include a processing circuit that is the same and/or similar to the processing circuit 206. The dataset manager 212 can be configured to identify images in the group of images provided by the image source 202 into distinct categories based on subject matter of the images provided by the image source 202. In some embodiments, the dataset manager 212 is configured to categorize or label all images provided by the image source 202 and/or categorize the images based on labels included with the images.

In some embodiments, the dataset manager 212 is configured to categorize or label only a subset of the images provided by the image source 202. The dataset manager 212 can be configured to delete from the memory 210 images provided by the image source 202 that are not deemed relevant to the operation of the image analysis system 200. The finite set of images provided by the image source 202 can include multiple examples of objects and features which are pertinent to the image analysis system 200. In some embodiments, the dataset manager 212 may receive images from multiple image sources that are the same as and/or similar to image source 202.

The dataset manager 212 can be configured to generate a training dataset 214 using all or a portion of the images from the image source 202. The training dataset 214 can be configured to contain images separated into object of interest image classes 216 and foreign object image classes 218. Each object of interest image classes 216 can be configured as a finite group of known images of objects that the image analysis system 200 may be configured to identify. The object of interest image classes 216 may include one or more images derived from one or more image sources 202. In some embodiments, the object of interest image class 216 is configured as a group of images representing a variety of objects, shapes, features, and edges that form one or more objects of interest that the image analysis system 200 can be configured to recognize. The one or more foreign object image classes 218 can be a finite group of images of objects which may partially occlude an image of the object of interest image classes 216 when analyzed by the image analysis system 200. In some embodiments, the one or more foreign object image classes 218 are configured as a group of images representing a variety of objects, shapes, features, and edges that form a foreign object or a group of foreign objects which may partially occlude one or more objects of interest contained within the object of interest classes.

The training dataset 214 is then provided as input to a model trainer 220 which is used to train the model 222 of the image analysis system 200 to identify an object of interest or multiple objects of interest based on the images of the object of interest image class 216. The model trainer 220 can also be configured to train the model 222 of the image analysis system 200 to remove foreign objects that might partially occlude an object of interest based on the images of the foreign object image class 218. Generally, the model trainer 220 will produce a more accurate image classification model 222 if the training dataset 214 includes many images in both the objects of interest image class 216 and the foreign object image class 218.

The images of objects of the foreign class and the class of objects of interest that are divided into the object of interest image class 216 and the foreign object image class 218 can be images of different objects such that for a particular object, that particular object only occurs in one of the sets. In this regard, the dataset manager 212 can be configured to cause the images of objects to be split up such that no images of the same object are in both sets. Examples of images of objects of interest and/or images of foreign objects include images of snow, rain, dust, dirt, windows, glass, cars, people, animals, a parking lot, a sidewalk, a building, a sign, a shelf, a door, a chair, a bicycle, a cup, a parking lot with snow, a parking lot with no snow, a parking space with snow, a parking space with no snow, a parking space with a car, a parking space with no car, and/or any other object.

The model trainer 220 can be configured to train the model 222 using one or more training methodologies including gradient descent, back-propagation, transfer learning, max pooling, batch normalization, etc. For example, in some embodiments, the model trainer 220 is configured to train the model 222 from scratch, i.e., where the model 222 has no prior training from some prior training data. In other embodiments, the model trainer 220 is configured to train the model 222 using a transfer learning process, wherein the model 222 has previously been trained to accomplish a different set of tasks and is repurposed to identify and remove objects, features, shapes, and edges contained in the training dataset 214. In some embodiments, the model trainer 220 can be configured to train the model 222 using a feature extraction methodology.

In some embodiments, the model 222 is a convolutional neural network including convolutional layers, pooling layers, and output layers. Furthermore, the model 222 can include an activation subtractor 224. The activation subtractor 224 can be configured to improve the accuracy of the model 222 in instances where a foreign object partially occludes an object of interest. The activation subtractor 224 improves the accuracy of the model 222 by deactivating the activations of neurons associated with some foreign object and modifying the activations of neurons associated with objects of interest by subtracting the activation levels of all foreign objects from the activation levels of the objects of interest.

In some embodiments, the image source 202 could be a security camera 102 (as shown in FIG. 1) overlooking a parking lot and building 100 (as shown in FIG. 1). The image source 202 can also be configured to provide an image 228 to the model implementer 226. The model implementer 226 can cause the image classification model 222 including activation subtractor 224 to operate using the image 228 as input. The model 222 and activation subtractor 224 can be configured to deactivate the activation levels of the neuron activations caused by foreign object classes. The model 222 will operate and produce output in the form of an image classification 230 whereby the image 228 is classified by assigning a probability to image classes.

The image classification 230 can be further provided as input to some application manager 232 where the image classification 230 could cause some operation to be performed. For example, the application manager 232 could utilize the image classification 230 signal to a building manager that a parking lot needs to be plowed if the image classification 230 shows that snow is present in the parking lot. The application manager 232 can be further configured to communicate with an edge device 204 connecting the local network of the security camera 102 with some external network. In some embodiments, the image classification 230 could be used by the application manager 232 to notify an external snow plow service, through the edge device 204, that there is snow present in the parking lot and that the parking lot must be plowed.

Referring now to FIG. 3A, a neuron 300 that can be used in a neural network is shown, according to an exemplary embodiment. In the neural network (e.g., a convolutional neural network), many neurons 300 can be used. The neuron 300 can be configured to include one or more input signals 302 and a neuron body 304. In some embodiments, the input signals 302 are provided by an image provided as input to some convolutional layer having multiple neurons 300 (e.g., are pixel color and/or intensity levels). In other embodiments, the input signals 302 are provided by some previous neural network layer having one or more neurons 300. The neuron body 304 includes a series of weights assigned to each of the input signals 302 by which each input signal is multiplied in the neural network. The neuron body 304 also includes a summation operation which takes the product all input signals 302 and their associated weights and add them together. Furthermore, a single bias value, b, is assigned to each neuron 300 and added to the sum of all weighted input signals 302. The weights and bias values can vary between the neurons 300 used in a convolutional neural network. In some embodiments, the summation operation is defined as follows:

$$n = b + \Sigma_{x=1}^{R}(p_x \times w_x)$$

The output of the summation operation and bias value is denoted as n in FIG. 3A. The output, n, may then be provided as input to an activation function 306. The activation function 306 is a function applied to n for each neuron 300 in order to adjust the neuron activation level into some that range of values. In some embodiments, the activation function 306 is applied to the output, n, to transform the output into some real number between zero and one. In some embodiments, the activation function 306 is configured as a sigmoid function having the following form:

$$a = \frac{1}{1+e^x}$$

In another embodiment, the activation function 306 could be configured as a rectified linear unit function (ReLU) having the following form:

$a = \max(0, x)$

In other embodiments, the activation function 306 could be some other linear or nonlinear function. The activation function 306 can be configured to create an activation level, a, within the desired range of real numbers. In some embodiments, the activation level of each neuron 300 is then provided as an input signal 302 to the neurons 300 of the next layer of the convolutional neural network.

Referring now to FIG. 3B, a convolutional neural network architecture 350 is shown, according to an exemplary embodiment. A network of the convolutional neural network architecture 350 can be configured to have multiple layers including an input layer 352, one or more convolutional layers 354, one or more pooling layers 356, a fully-connected layer 358, and an output layer 360. In some embodiments, the input layer 352 is configured as an image containing various objects, features, shapes, and edges. The convolutional layers 354 convolve one or multiple filter kernel with the input layer 352 to examine the contents of the input layer 352 for various objects, features, shapes, and edges. As the convolutional layer 354 applies a filter to multiple receptive fields of the preceding input layer 352 or preceding convolutional layer 354, neurons 300, as described with reference to FIG. 3A, of the convolutional layer 354 are activated based on the output from the filter at each receptive field. As described with reference to FIG. 3A, each neuron 300 can be assigned an activation level based on one or more input signals 302 for each receptive field provided by the filter, weights associated with each filter application, a bias for each neuron 300, and an activation function 306. In some embodiments, multiple pooling layers 356 are used to further condense the spatial dimensions of the data matrix. In some embodiments, a pooling layer 356 is often used directly after a convolutional layer 354. In other embodiments, the convolutional neural network architecture 350 includes multiple convolutional layers 354 and multiple pooling layers 356 where each convolutional layer 354 is followed by one or more pooling layers 356.

In other embodiments, the convolutional neural network architecture 350 includes the fully-connected layer 358. In these embodiments, the fully-connected layer is implemented to take the matrix output from the preceding convolutional layer 354 or pooling layer 356 and create a vector containing information only related to features present in the input layer 352 but no spatial information relating to the input layer 352. Because fully-connected layers contains no spatial information, the fully-connected layer 358 can be omitted from the convolutional neural network architecture 350 in order to preserve the spatial information associated with the input layer 352, according to some embodiments.

The output layer 360 can be configured to provide output from the convolutional neural network architecture 350. In some embodiments, the output layer 360 is configured to provide a probability value associated with each output category. For example, the output layer 360 may be configured to present a probability that the input layer 352 is an image of a dog, cat, or mouse. Accordingly, the output layer 360 will output a probability value for each of the three image classifications with the highest probability value representing the most likely classification of the input layer 352. In some embodiments, a final activation function 306 as described with reference to FIG. 3A, also called an object classifier (e.g., Softmax), is used to provide the image classification probabilities based on the input layer 352 to the output layer 360. In other embodiments, linear support vector machine (SVM) may be used to classify the objects of an input layer 352 and provide the output of such classification in the output layer 360.

Figure 4A:
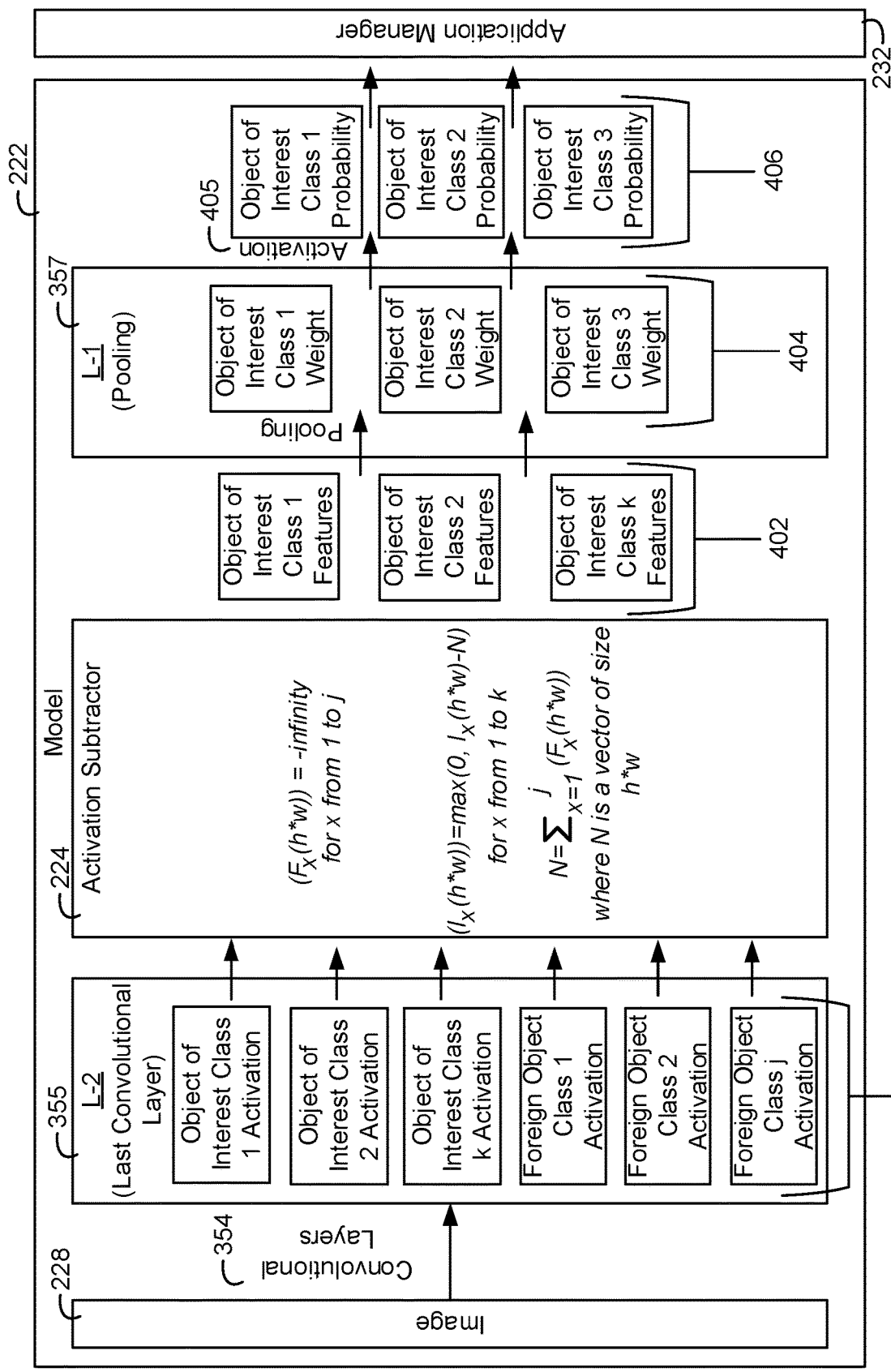
FIG. 4A is a block diagram of the image classification model with the activation subtractor of FIG. 2 shown in greater detail, according to exemplary embodiment.
Figure 4B:
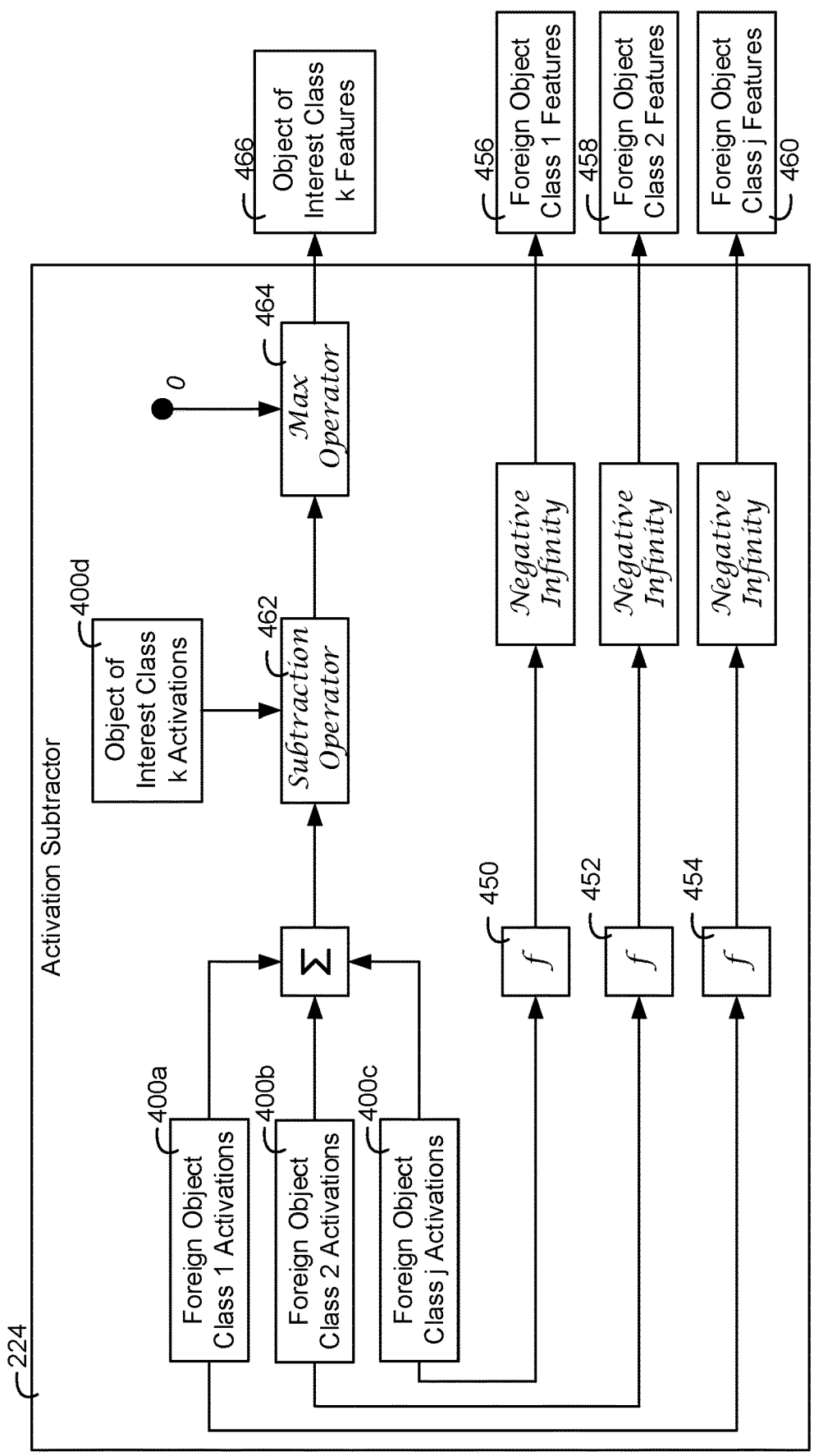
FIG. 4B is a block diagram of the activation subtractor of FIG. 4A shown in greater detail removing activations of foreign classes from activations of a class of interest, according to an exemplary embodiment.

Referring now to FIGS. 4A and 4B, a flow diagram showing the model 222 and activation subtractor 224 as described with reference FIG. 2 are shown in greater detail, according to an exemplary embodiment. In some embodiments, the model 222 is configured with the convolutional neural network architecture 350 as described with reference to FIG. 3B. The image 228 can be provided as the input layer 352 as described with reference to FIG. 3B to the model 222, as implemented by the model implementer 226 as described with reference to FIG. 2.

The model 222 can be configured to apply one or multiple convolutional layers 354 as and pooling layers 356 as described with reference to FIG. 3B as the model 222 operates. At convolutional layer L-2 355, the last (or only) convolutional layer of the model 222, the activations 400 from the preceding layer can be classified as being object of interest class activations 400d or foreign object class activations 400a, 400b, and 400c, i.e., activations for classes of interest that the model 222 has been trained on or activations for foreign classes that the model 222 has been trained on. Convolutional layer L-2 355 can be configured to have multiple activations 400, including one or more foreign object class activations 400a, 400b, and 400c, as well as one or more object of interest class activations 400d.

In some embodiments, the activations 400 are provided to the activation subtractor 224 where the activation levels of the activations 400 are modified by the activation subtractor 224. The activation subtractor 224 can be used to modify the activation levels of the activations 400 to allow the model 222 to provide accurate image classification 230 even though an object in the image 228 is at least partially occluded by a foreign object, as described with reference to FIG. 2, to the application manager 232. According to some embodiments, the activation subtractor 224 can generate a matrix N defined as:

$N = \Sigma_{x=1}^{j}(F_x(h \times w))$, where N is a matrix of size $h \times w$ In some embodiments, the activation subtractor 224 will modify the activation level of foreign object class activations 400a, 400b, and 400c to negative infinity as shown by the following equation:

$F_x(h \times w) = -\infty$ for x from 1 to j

The foreign object class activations 400a, 400b, and 400c can be set to negative infinity using removal operations 450, 452, and/or 454 respectively. By setting the foreign object class activations 400a, 400b, and 400c to negative infinity using removal operations 454, 452, and 450, foreign class features 456, 458, and 460 are effectively removed from the model 222 by the activation subtractor 224. While a foreign object or multiple foreign objects may exist in the image 228, the model 222 will not classify such foreign objects because their foreign class features 456, 458, and 460 have been removed from the model 222 by the activation subtractor 224.

In some embodiments, the activation subtractor 224 is further configured to modify the activation level of each of the k object of interest class activations, e.g., object of interest class activations 400d, according to the matrix N using the following subtraction operator 462 and max operator 464:

Subtraction Operator 462: $I_x(h \times w) - N$

Max Operator 464: $I_x(h \times w) = \max(0, I_x(h \times w) - N)$ for $x$ from 1 to $k$ The subtraction operator 462 is configured, in some embodiments, to modify the activation levels of the object of interest class activations 400d by subtracting the value of matrix N from the object of interest class activations 400d. By subtracting the value of matrix N from the activation levels of the k object of interest class activations 400d, the activation subtractor 224 adjusts the activation level of the k object of interest class activations 400d to account for the presence of foreign object occlusions in the image 228. This modification ensures that when the activations 400 of convolutional layer L-2 355 strongly suggest the presence of one or multiple foreign objects, the activation level of object of interest activations will not be artificially high when the foreign object class activations 400a, 400b, and 400c have been removed.

In instances where activations 400 of convolutional layer L-2 355 strongly suggest the presence of foreign object occlusions (i.e., when the subtraction operator 462 computes some negative number for a particular activation, x), the max operator 464 can be configured to set the activation level for object of interest class activations 400d to zero. The subtraction operator 462 and max operator 464 can be configured to modify the object of interest class activations 400d to create new activation levels for one or more object of interest features 466 having some activation level greater than or equal to zero.

Based on the above modifications to activations 400 by removal operations 450, 452, and 454, subtraction operator 462, and max operator 464, the activation subtractor 224 may be further configured to provide activation subtractor output 402, object of interest class features. The activation subtractor output 402 is then provided as input to pooling layer L-1 357. As described above, the implementation of the activation subtractor 224 and associated removal operations 450, 452, and 454 can result in foreign class features 456, 458, and 460 having an activation level equal to negative infinity, according to some embodiments.

Similarly, the implementation of the activation subtractor 224 and associated subtraction operator 462 and max operator 464 can result in object of interest class features 466 having some activation level greater than or equal to zero. Because foreign object class features 456, 458, and 460 are set to negative infinity, they are removed by the activation subtractor 224 and not provided as activation subtractor output 402. Accordingly, activation subtractor output 402 can include one or more object of interest class features 466 that result from the activation subtractor 224, but no foreign object class features 456, 458, 460, according to some embodiments.

In some embodiments, pooling layer L-1 357 is configured to accept the activation subtractor output 402 as input. The pooling layer L-1 357 can be configured to generate one or more object of interest class weights 404 using the activation subtractor output 402. Global Average Pooling (GAP) can be used to transform activation subtractor output 402 to pooling layer L-1. The GAP transformation can be configured to map each tensor or feature map of size h×w to a tensor of size 1×1, where each resulting tensor of size 1×1 is one of the weights 404. As a result of GAP, each h×w feature map (i.e., activation subtractor output 402) is reflected as a single number by taking an average of all h×w values. In some embodiments, GAP is used to reduce the spatial dimensions of a tensor while preserving the spatial information of the original input. The pooling layer L-1 357 can be configured as the group of object of interest class weights 404 resulting from the GAP operation.

In some embodiments, the pooling layer L-1 357 is further configured to provide input to an activation function 405. The activation function 405 is configured to map or transfer the activation levels of the weights 404 to some uniform range of values (e.g., from zero to one). Using the weights 404, the activation function 405 can be configured to generate a group of object of interest class probabilities 406. Because unique weights are used for each object of interest class, the activation function 405 is applied in some embodiments to create object of interest class probabilities 406 for a variety of object of interest features 466 that can be compared within a uniform range of values.

The activation function 405 can be either a linear or nonlinear function and can exist in a variety of different mathematical forms. In some embodiments, the activation function 405 is configured as a Softmax activation function. In other embodiments, the activation function 405 might be some other function (e.g. ReLU, leaky ReLU, or sigmoid function). If a bias value is added to any of the weights 404, the activation function 405 may be used after the bias has been added. The activation function 405 can be the same and/or similar to the activation function 306 as described with reference to FIG. 3A.

The object of interest class probabilities 406 can be configured to indicate the likelihood that the object or objects in the image 228 are classified as one or more of objects of interest belonging to the object of interest classes. In some embodiments, the object of interest class probabilities 406 are configured as decimal number between zero and one where a higher number indicates a greater likelihood that the image 228 includes some particular object of interest class feature 466. In other embodiments, the object of interest class probabilities 406 are configured as one of two round numbers (e.g. zero or one) where the greater number indicates that the image 228 more likely than not includes some particular object of interest feature 466 and the lesser number indicates that the image 228 more likely than not does not include some object of interest feature 466.

The object of interest class probabilities 406 are provided as input for the application manager 232, according to an exemplary embodiment. Based on the object of interest class probabilities 406, the application manager 232 can be configured to perform some operation or command the performance of some operation based on one or more of the object of interest class probabilities 406. For example, the application manager 232 could be configured to send a signal to a building operator to perform a snow plowing service if the object of interest class probabilities 406 indicate a strong likelihood that snow is present in a parking lot. In some embodiments, the application manager 232 is configured to determine, based on some combination of one or more object of interest class probabilities 406 that one or more operations that must be performed. In other embodiments, the application manager 232 is configured to command some series of operations in a particular order based on the hierarchy of object of interest class probabilities 406. For example, based on a detection of human occupancy in a room or building via the classification, application manager 232 could be configured to operate building equipment to control an environmental condition of a building. Examples of building equipment configured to control an environmental condition of a building are provided in U.S. patent application Ser. No. 15/644,519 filed Jul. 7, 2017, the entirety of which is incorporated by reference herein.

In some embodiments, the model 222 with activation subtractor 224, is configured to accurately classify objects in image 228 belonging to an object of interest class, particularly in instances when one or more foreign objects belonging to a foreign object class partially occlude the object of interest in the image 228. In such embodiments, the activation subtractor 224 will remove the foreign object class features 456, 458, and 460, leaving only object of interest class features (output 402) for classification within the model 222. This embodiment allows for the accurate identification of objects belonging to the object of interest class despite the presence of foreign objects belonging to the foreign object class.

Moreover, the activation subtractor 224 can be configured to operate within a single forward pass of the model 222 between convolutional layer L-2 355 and pooling layer L-1 357 (or through the entire model 222). By operating between convolutional layer L-2 355 and pooling layer L-1 357, the activation subtractor 224 can complete the removal of foreign objects belonging to the foreign object class during a single forward pass of the convolutional neural network architecture 350. Operation of the activation subtractor within a single forward pass of the convolutional neural network architecture 350 can allow for the efficient operation of the model 222 when foreign objects belonging to the foreign object class partially occlude an object of interest belonging to the object of interest class within an image 228. For example, performing a single pass can be more resource efficient (use less processor cycles, less memory, etc.) than performing multiple passes.

Figure 5:
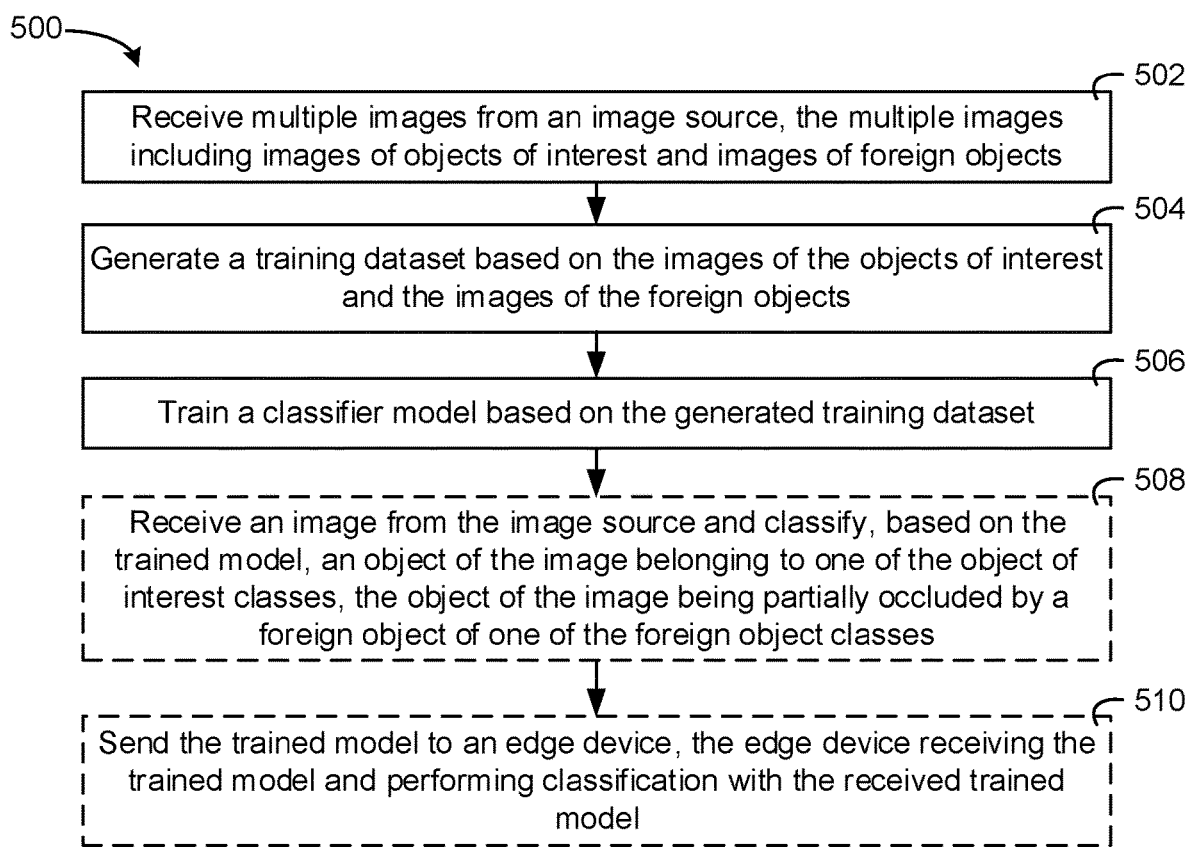
FIG. 5 is a flow diagram of a process for training the image classification model of FIG. 2 that can be performed by the image analysis system of FIG. 2, according to an exemplary embodiment.

Referring now to FIG. 5, a flow diagram of a process 500 for training the image classification model 222 that can be performed by the image analysis system 200 is shown, according to an exemplary embodiment. In some embodiments, the security camera 102 of FIG. 1 and/or the image analysis system 200 of FIG. 2 can be configured to perform the process 500. Furthermore any computing device as described herein can be configured to perform the process 500.

In step 502, the image analysis system 200 receives multiple images from an image source 202 where the multiple images include images of objects of interest and images of foreign objects. In some embodiments, the image source 202 could be one or more cameras and/or databases providing one or more images of objects of interest and/or foreign objects. The image source 202 can be configured as a computing system including a database, server system, and/or can include a processing circuit that is the same and/or similar to the processing circuit 206. In some embodiments, the image analysis system 200 can receive images from the image source 202 in classes of images, e.g., the object of interest image classes 216 and/or the foreign object image class 218. The images received by the image analysis system 200 can be received by the dataset manager 212. In some embodiments, the dataset manager 212 is configured to receive multiple images of objects of interest and/or foreign objects that have not been assigned to any class.

In step 504, the image analysis system 200 can be configured to generate the training dataset 214 based on images of the objects of interest and the images of the foreign objects. For example, the dataset manager 212 can be configured to sort and/or categorize images into image classes, e.g., one or more object of interest image classes 216 and/or one or more foreign object image classes 218. In some embodiments, the dataset manager 212 can categorize images by assigning a label or some metadata identifier to the image denoting the respective image class. In some embodiments, the object of interest image classes 216 and foreign object image classes 218 are included in the training dataset 214. The model trainer 220 can be configured to receive the images of the training dataset 214 for the purposes of training the model 222 of the image analysis system 200.

In step 506, the image analysis system 200 can be configured to train the model 222 using the model trainer 220. The model trainer 220 can be configured to train the model 222 to identify and/or classify an object of interest or a foreign object based on the respective images contained in the one or more object of interest image classes 216 and the one or more foreign object image classes 218 belonging to the training dataset 214. The model trainer 220 can also be configured to train the model 222 to identify and/or remove foreign objects that partially occlude an object of interest. In some embodiments, the model trainer 220 can be configured to train the model 222 using one or more training methodologies (e.g., gradient descent, back-propagation, transfer learning, max pooling, batch normalization, etc.). For example, the model trainer 220 can be configured to train the model 222 using only the images of the training dataset 214. In other embodiments, the model trainer 220 is configured to train the model 222 using a transfer learning process where the model 222 is trained using images from a different image dataset in addition to images from the training dataset 214.

In some embodiments, the model 222 includes an activation subtractor 224. The activation subtractor 224 can be configured to handle foreign objects in the image 228 that partially occlude an object of interest. In some embodiments, the activation subtractor 224 will remove foreign objects that occlude objects of interest according to the model 222 that has been trained by the model trainer 220 to identify objects belonging to one of the object of interest classes.

In optional step 508, the image analysis system 200 can be further configured to receive an image 228 from the image source 202 and classify the image 228 based on the model 222 that has been trained by the model trainer 220 using the training dataset 214. The image 228 can be configured as an image featuring some object of interest that is partially occluded by one or more foreign objects of one or more of the foreign object image classes 218. In some embodiments, the image analysis system 200 includes the model implementer 226 configured to implement the model 222 and activation subtractor 224 for purposes of classifying image 228. The model implementer 226 can be configured to cause the model 222 to operate and classify image 228 based on the model trainer 220. The model implementer 226 can be configured to provide the image classification 230 as output. In some embodiments, the image classification 230 is a probability that the image 228 contains some object or multiple objects.

In optional step 510, the image analysis system 200 can be implemented with model 222 trained by model trainer 220 by the edge device 204. In some embodiments, the image analysis system 200 can be configured to include the application manager 232 to provide the image classification 230 to the edge device 204, where only the image classification 230 is provided to the edge device 204. In other embodiments, the edge device 204 can be configured to implement the trained model 222 and/or provide image classification 230 output to some external network. For example, the edge device 204 could provide image classification 230 output indicating that a parking lot is covered with snow to some external snow plowing service provider. In this regard, the trained model 222 is efficient enough to be implemented directly by an edge device such as a camera or any other kind of low power consuming, low memory, and/or low processing power device.

Figure 6:
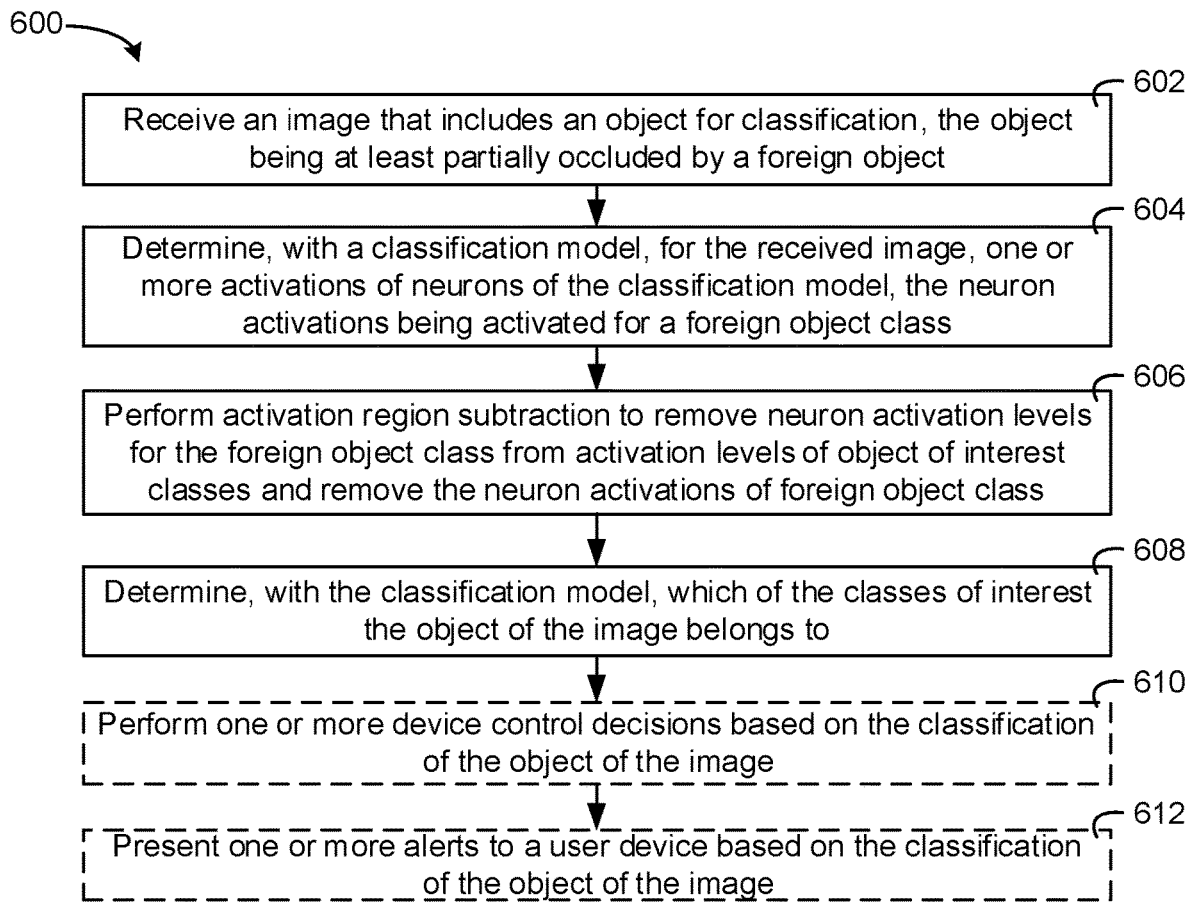
FIG. 6 is a flow diagram of a process for implementing activation subtracting via the image classification model of FIG. 2 that can be performed by the image analysis system of FIG. 2, according to an exemplary embodiment.

Referring now to FIG. 6, a flow diagram of a process 600 implementing the image classification model 222 with activation subtractor 224 of FIG. 2 that can be performed by the image analysis system 200 of FIG. 2, according to an exemplary embodiment. In some embodiments, the security camera 102 of FIG. 1 and/or image analysis system 200 can be configured to perform the process 600. Moreover, any computing device as described herein can be configured to perform the process 600.

In step 602 of process 600, the image analysis system 200 receives the image 228 that includes an object of interest that requires classification where the object of interest is at least partially occluded by some foreign object. In some embodiments, the image 228 includes one or more multiple objects and/or one or multiple foreign objects. The one or more foreign objects might occlude the one or more objects of interest such that the image analysis system will be unable from accurately classifying the objects of interest without some occlusion handling method. The image 228 can be provided by one or more image sources 202. In some embodiments, the image source 202 could be one or more cameras providing one or more images of objects of interest and/or foreign objects. The image source 202 can be configured as a computing system including a database, server system, and/or can include a processing circuit that is the same and/or similar to the processing circuit 206.

In step 604 of the process 600, the image analysis system 200 determines activations of neurons of the image classification model 222 being activated for objects belonging to one or more foreign object classes 218. The model 222 is configured to determine the activations of neurons belonging to one or more foreign object image classes based on the model trainer 220, which can be configured to train the model 222 using the training dataset 214. The training dataset 214 can include one or more object of interest image classes 216 and one or more foreign object image classes 218. Based on the images in the foreign object image class 218, the model 222 can be configured to determine the activations of foreign object classes included in the one or more foreign object classes. In some embodiments, the model 222 will also identify activations of neurons associated with one or more object of interest classes.

In step 606 of process 600, the image analysis system 200 can be configured to perform an activation region subtraction operation executed by the activation subtractor 224. The activation subtractor 224 can be configured to remove (e.g., subtract) neuron activation levels of foreign object classes belonging to the foreign object class from the neuron activation levels of the object of interest image classes. In some embodiments, activation subtractor 224 is configured to set the neuron activation level to zero for the classes of interest when the neuron activation levels for foreign objects is greater than the neuron activation level for objects of interest. Furthermore, the activation levels for the foreign class can be removed, e.g., set to negative infinity. The activation subtractor 224 can be configured to operate during the operation of the model 222, but before the model 222 provides the image classification 230.

In step 608 of the process 600, the image analysis system 200 determines, using the model 222, which class the object of interest in the image 228 belongs to. The model 222 can be configured to classify the image 228 based on the object of interest image classes 216 and foreign object image classes 218 used by the model trainer 220 to train the model 222. The object of interest in the image 228 is classified by the model 222 after the neuron activations associated with objects belonging to the foreign object image classes 218 have been removed from the neuron activations for the objects belonging to the object of interest image classes 218. After the activations for objects belonging to the foreign object classes have been removed from the neuron activations for objects belonging to the object of interest classes, the model 222 can be configured to classify one or more objects in the image 228 as belonging to one or more object of interest image classes 216. In some embodiments, the classification 230 of one or more objects is provided as a numerical value (e.g., probability) or as a true/false indicator.

In optional step 610 of process 600, the image analysis system 200 can be configured to perform one or more device control decisions based on the classification 230 of the image 228 provided by the model 222. For example, the classification 230 might indicate, after neuron activations of occluding foreign objects (e.g., pedestrians 106 of FIG. 1) have been removed from the image 228, that the sidewalk 108 of FIG. 1 is covered with snow. Accordingly, the image analysis system 200 can be configured to perform a device control decision that prompts some snow removal service. In some embodiments, the device control decisions are performed by the application manager 232 of the image analysis system 200. The application manager 232 can be configured to execute device control decisions and/or provide device control decisions to the edge device 204.

In optional step 612 of process 600, the image analysis system 200 can be configured to perform one or more device control decisions that present one or more alerts to a user device based on the classification 230 of image 228. In some embodiments, the alerts prompted by one or more device control decisions could be provided to a user's mobile device, a user's personal computer, etc. In other embodiments, alerts could be provided to one or more users belonging to the same network as the image analysis system 200, to one or more users belonging to a network external to the network of the image analysis system 200, or to some combination thereof. The image analysis system 200 could be further configured to provide alerts to select users based on some workflow utilizing parameters such as GPS location, user permissions, etc. For example, the image analysis system 200 can be configured to present an alert that there is a spill in a corridor of building 100 requiring clean up, based on classification 230 of image 228, to a janitorial staff member in closest proximity to the spill.

Figure 7:
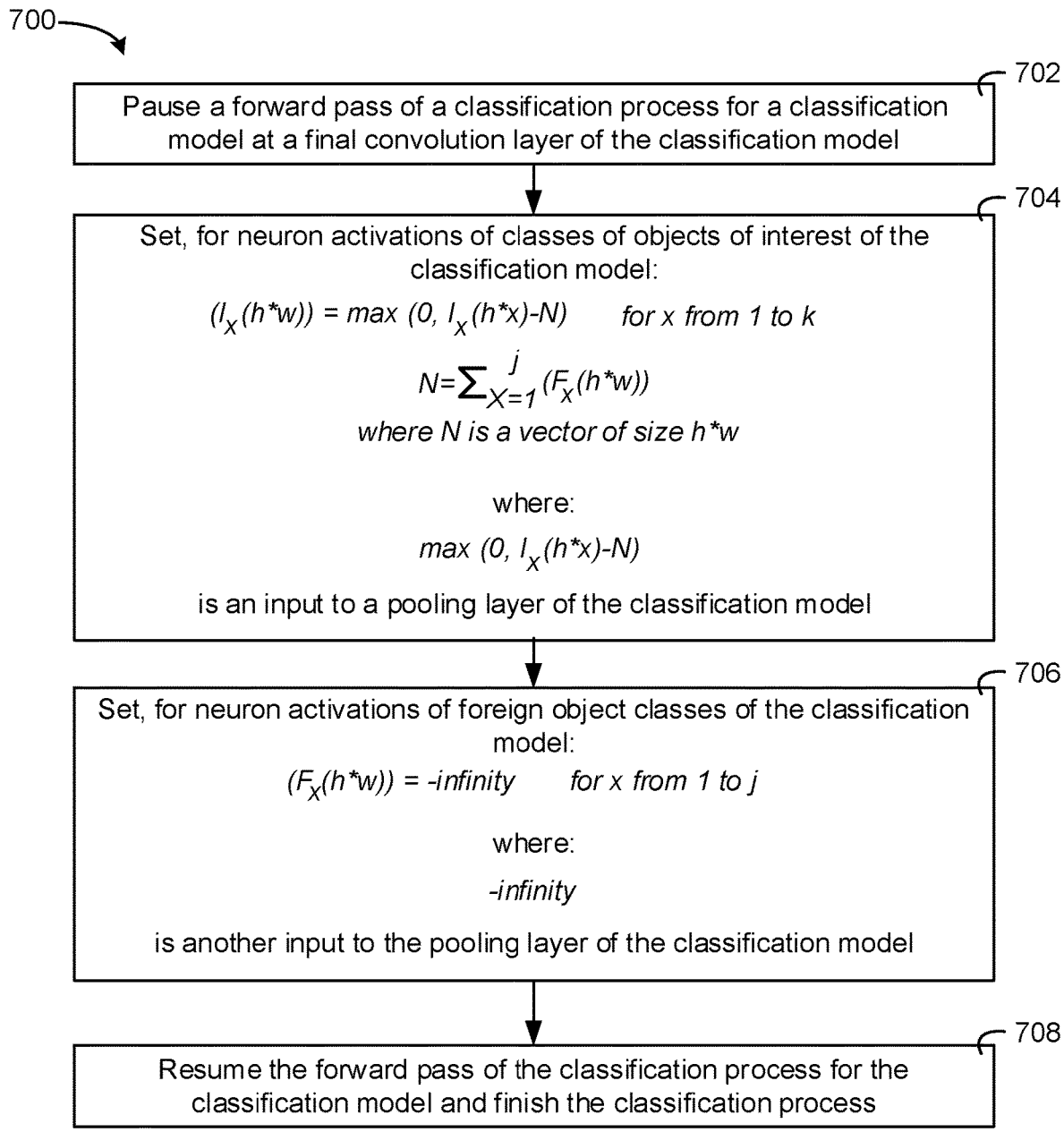
FIG. 7 is a flow diagram of a process for deactivating activations of neurons for foreign objects and classifying an object of interest based on that deactivation, according to an exemplary embodiment.

Referring now to FIG. 7, a flow diagram of a process 700 for performing activation subtraction using the activation subtractor 224 and classifying the image 228 based on the activation subtraction is shown, according to an exemplary embodiment. In some embodiments, the security camera 102 of FIG. 1 and/or image analysis system 200 of FIG. 2 can be configured to perform the process 700. Moreover, any computing device as described herein can be configured to perform the process 700.

In step 702 of process 700, the image analysis system 200 can be configured to pause a forward pass of the image classification process of the model 222 at the final convolutional layer L-2 355 of FIG. 4A. In some embodiments, the model 222 of image analysis system 200 is configured to classify the objects of the image 228 using convolutional neural network architecture 350 of FIG. 3. The model 222 may be further configured to include convolutional neural network architecture 350 having multiple convolutional layers 354 and pooling layers 356. In some embodiments, the final convolutional layer L-2 of FIG. 4A is followed by a final pooling layer L-1 of FIG. 4A before object of interest class probabilities 406, as described in FIG. 4A, are provided as output. The model 222 can be configured to pause the classification process between final convolutional layer L-2 355 and final pooling layer L-1 357 for the purposes of performing an occlusion handling operation e.g., activation subtraction.

In step 704 of process 700, the image analysis system 200 can be configured to execute the activation subtractor 224 of FIG. 4A between the final convolutional layer L-2 355 and the final pooling layer L-1 357. In some embodiments, the activation subtractor 224 is configured to subtract the neuron activations for objects belonging to the foreign object classes from the neuron activations for objects belonging to the object of interest classes by the following equations:

$$I_x(h \times w) = \max(0, I_x(h \times w) - N) \text{ for } x \text{ from 1 to } k,$$

$$N = \Sigma_{x=1}^{j}(F_x(h \times w)) \text{ where } N \text{ is a matrix of size } h \times w$$

The activation subtractor 224 can be configured to subtract neuron activations according to the above equations using the output from a convolutional layer 354 and to provide the subtracted activations, $\max(0, I_x(h \times w) - N)$, as input to the pooling layer 357.

In step 706 of process 700, the image analysis system 200 is further configured to set the neuron activations for objects belonging to the foreign object image classes 218 to negative infinity according to the following equation:

$$F_x(h \times w) = -\text{infinity for } x \text{ from 1 to } j$$

By setting the neuron activations of objects belonging to the foreign object image classes 218, the activation subtractor 224 of the model 222 effectively deactivates the neuron activations of objects belonging to the foreign object classes. The activation subtractor 224 can be further configured to deactivate neuron activations of objects belonging to the foreign object classes according to the above equation using the output from a convolutional layer 354. The activation subtractor 224 then provides −infinity as input to a pooling layer 356. In some embodiments, the activation subtractor 224 is configured to deactivate neuron activations provided by the final convolutional layer L-2 355 and provide the activation subtractor output 402 as input to the final pooling layer L-1 357.

In step 708 of process 700, the image analysis system 200 is configured to resume the forward pass of the classification process of model 222 in order to finish the classification process. In some embodiments, the activation subtractor 224 is configured to provide activation subtractor output 402 as input to the final pooling layer L-1 357. The final pooling layer L-1 can be configured to complete a pooling operation (e.g., by a Global Average Pooling (GAP) process) using activation subtractor output 402. The final pooling layer L-1 357 can be configured to provided weights 404 as output. Weights 404 can be configured to as input to an activation function 405, where the activation function 405 can be configured to generate object of interest class probabilities 406. In some embodiments, the activation function 405 could be one or more linear or nonlinear function (e.g., ReLU, Leaky ReLU, Sigmoid, etc.) that transforms the weighted object of interest features into some real number value in a known range of real numbers (e.g., 0 and 1). In some embodiments, the resulting object of interest class probabilities 406 are presented as some number between 0 and 1 and reflect the likelihood that a certain object belonging to the object of interest classes is present in the image 228.

The model 222 of the image analysis system 200 can be configured to output an image classification 230 based on the object of interest class probabilities 406. In some embodiments, the image analysis system 200 can perform one or more device control decisions based on image classification 230. The image analysis system 200 can be further configured to provide image classification 230 to an application manager 232 and/or an edge device 204 for the purposes of executing one or more device control decisions.

Figure 8:
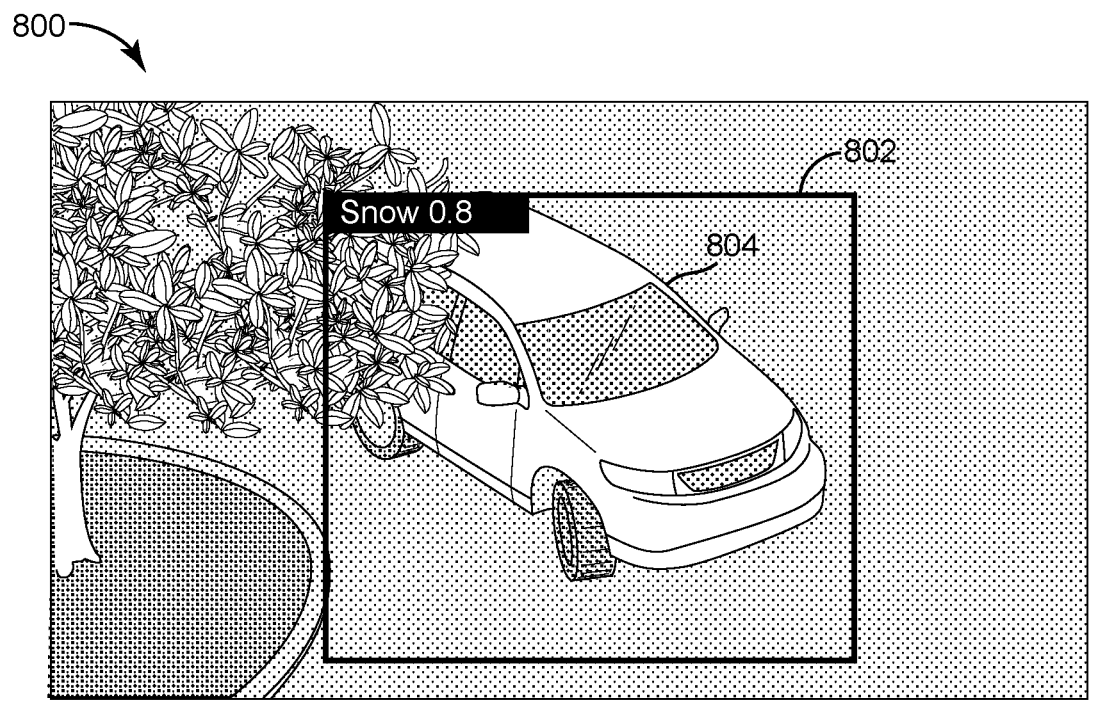
FIG. 8 is a drawing of an image including a partially occluded object incorrectly classified with an image classification model, the image classification model not including an activation subtractor, according to an exemplary embodiment.

Referring now to FIG. 8, a drawing of an image 800 including a partially occluded object classified with an image classification model without an activation subtractor 224 is shown, according to an exemplary embodiment. The image 800 depicts a portion of a parking lot surface. The image 800 further includes a white foreign object 804, a white car that is shown driving over the parking lot surface. The image classification model without an activation subtractor 224 is configured to classify a classification region 802 of the image 800 containing both the parking lot surface and the foreign object 804. The classification region 802 is configured such that the foreign object 804 partially occludes the parking lot surface. The image classification model without an activation subtractor 224 is configured to classify the portion of the image 800 contained within the classification region 802 as being either "cleared" or "snow," where "cleared" indicates that there is no snow in the parking lot and "snow" indicates that there is snow in the parking lot. In addition, the image classification model without activation subtractor 224 is configured to display a probability value associated with the classification of either "cleared" or "snow."

The image classification model without activation subtractor 224 is shown as miss-classifying the classification region 802 as "snow," where the classification is based upon the presence of the white foreign object 804 in the image classification region 802. Without an activation subtractor 224, the image classification model incorrectly classifies the classification region 802 because of the white foreign object 804 that occludes the parking lot surface.

Figure 9:
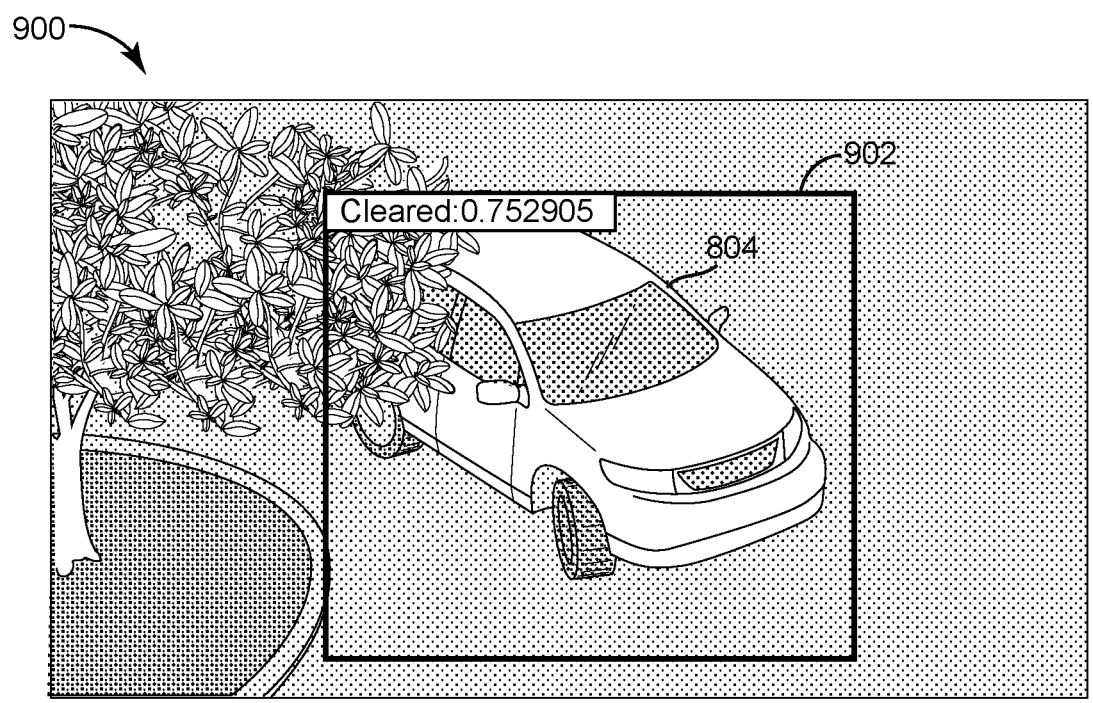
FIG. 9 is a drawing of an image including a partially occluded object correctly classified with the image classification model that includes the activation subtractor of FIG. 2, according to an exemplary embodiment.

Referring now to FIG. 9, a drawing of an image 900 including a partially occluded object classified with the image classification model 222 that includes an activation subtractor 224 is shown, according to an exemplary embodiment. The image 900 depicts a portion of a parking lot surface. The image 900 further includes the white foreign object 804 (as shown in FIG. 8) shown driving over the parking lot surface. The image 900 is configured to include an a classification region 902 of the image 900 containing both the white foreign object 804 and the parking lot surface. The image classification model 222 is configured to classify the object within the classification region 902 as being either "cleared" or "snow," where a classification of "cleared"

indicates that the parking lot surface is clear of snow and a classification of "snow" indicates that the parking lot has not been cleared of snow.

Unlike the incorrect classification of image classification region 802 (as shown in FIG. 8) by the image classification model without activation subtractor 224, the image classification model 222 with activation subtractor 224 is configured to correctly classify the objects within image classification region 902. Despite the presence of the white foreign object 804 within the image classification region 902 that partially occludes the parking lot surface, the image classification model 222 with activation subtractor 224 is configured to classify the parking lot surface of image 900 as being "cleared" of snow.

Figure 10:
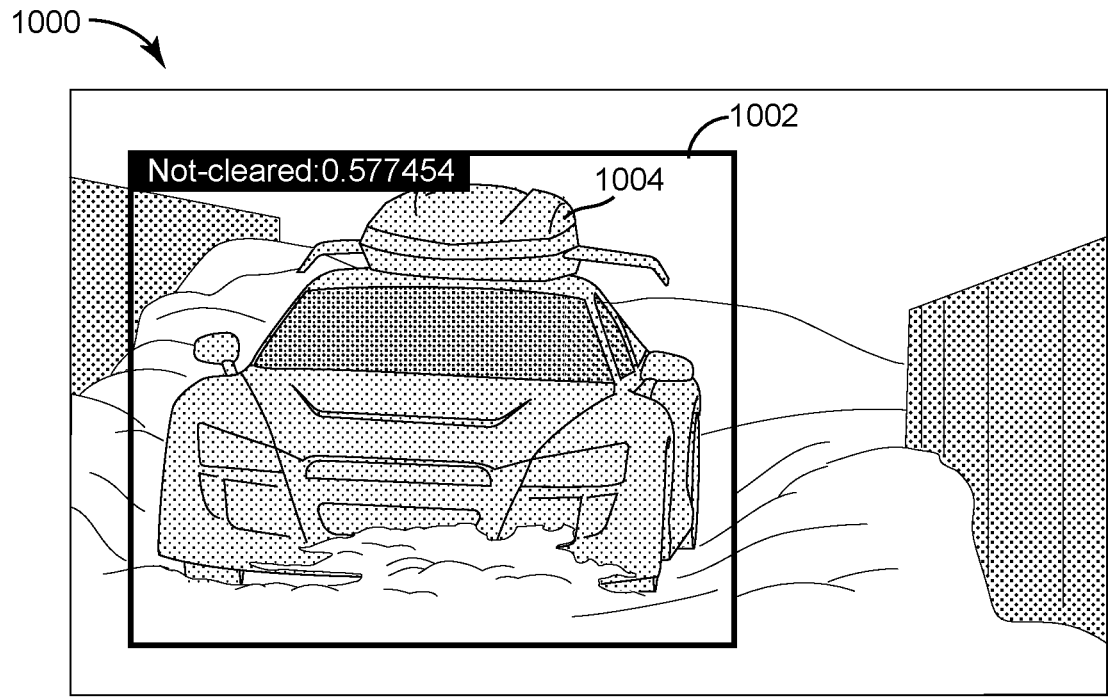
FIG. 10 is a drawing of another image including a partially occluded object correctly classified with the image classification model that includes the activation subtractor of FIG. 2, according to an exemplary embodiment.

Referring now to FIG. 10, a drawing of an image 1000 including a partially occluded object classified with an image classification model 222 including an activation subtractor 224 is shown, according to an exemplary embodiment. Image 1000 is configured to depict a roadway surface. The image 1000 is further configured to include a dark foreign object 1004 (e.g., black, blue, red, green, etc.), a car driving over the roadway surface. Image 1000 is further configured to include a classification region 1002 that bounds a portion of the image to be classified by the image classification model 222. According to an exemplary embodiment, the classification region 1002 is configured to include a portion of the roadway surface and the dark foreign object 1004. The image classification model 222 with activation subtractor 224 is configured to classify the contents of the classification region 1002 as being either "cleared" or "not-cleared," where a classification of "cleared" indicates that the parking lot surface is clear of snow and a classification of "not-cleared" indicates that the parking lot has not been cleared of snow. According to an exemplary embodiment, the image classification model 222 with activation subtractor 224 is configured to accurately classify contents of the classification region 1002 of image 1000 as being "not-cleared" despite the partial occlusion of the roadway surface by the dark foreign object 1004.

Figure 11:
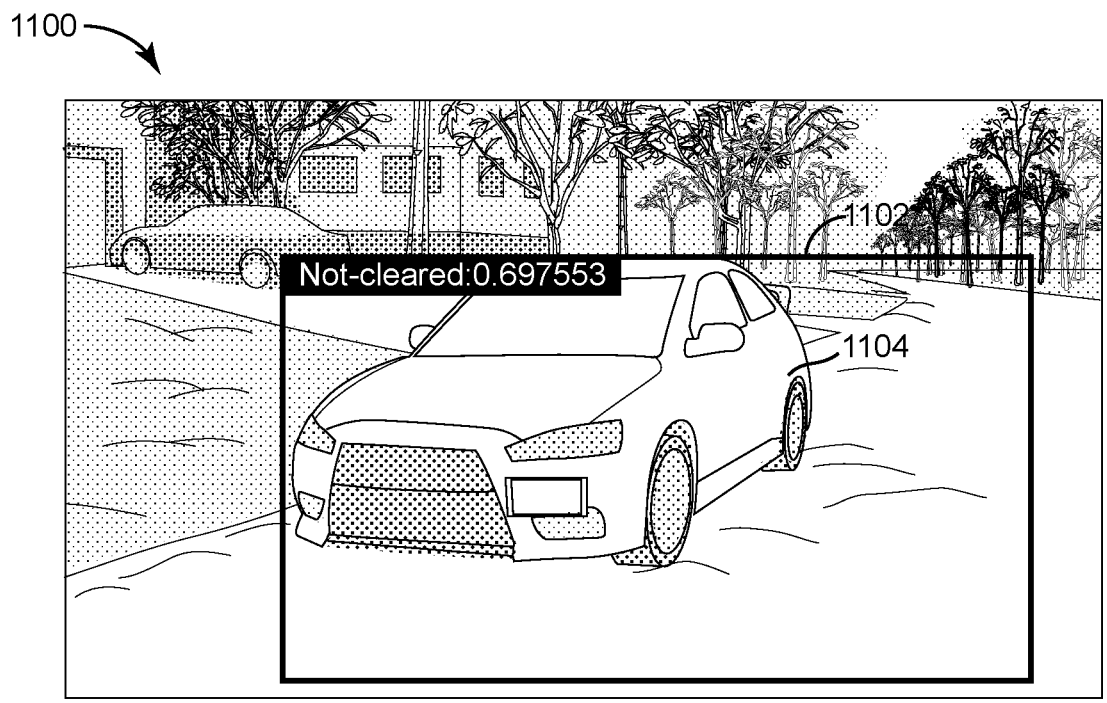
FIG. 11 is a drawing of yet another image including a partially occluded object correctly classified with the image classification model that includes the activation subtractor of FIG. 2, according to an exemplary embodiment.

Referring now to FIG. 11, a drawing of an image 1100 including a partially occluded object classified with the image classification model 222 with the activation subtractor 224, according to an exemplary embodiment. Image 1100 is configured to depict a portion of a roadway surface. The image 1100 is further configured to include a white foreign object 1104, a car parked on the roadway surface. The image 1100 further includes a classification region 1102 configured to bound a portion of the image for classification by the image classification model 222. The classification region 1102 of image 1000 is configured to include a portion of the roadway surface as well as the white foreign object 1104. According to an exemplary embodiment, the image classification model 222 with activation subtractor 224 is configured to classify the contents of the classification region 1102 as being either "cleared" or "not-cleared," where a classification of "cleared" indicates that the parking lot surface is clear of snow and a classification of "not-cleared" indicates that the parking lot has not been cleared of snow. The image classification model 222 with activation subtractor 224 is configured to accurately classify the contents of the image classification region 1102 as "not-cleared" despite the partial occlusion of the roadway surface by the white foreign object 1104.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for classifying an object of an image that is partially occluded by a foreign object, the method comprising:

receiving, by one or more processing circuits, the image of the object that is partially occluded by the foreign object; and classifying, by the one or more processing circuits, the object of the image into one of one or more classes of interest via an artificial neural network (ANN) by:
  determining a plurality of neuron activations of neurons of the ANN for one or more foreign classes and the one or more classes of interest;
  subtracting one or more of the neuron activations of the one or more foreign classes from the neuron activations of the one or more classes of interest, wherein the foreign object belongs to one of the one or more foreign classes; and
  classifying the object of the image into the one of the one or more classes of interest based on the subtracting.

2. The method of claim 1, wherein determining the neuron activations of the neurons of the ANN for the one or more foreign classes and the one or more classes of interest comprises performing, with the image, one or more convolutions via one or more convolutional layers of the ANN, wherein an output of the one or more convolutions is the neuron activations of the neurons of the ANN for the one or more foreign classes and the one or more classes of interest, wherein the ANN is a convolutional neural network (CNN).

3. The method of claim 1, wherein classifying, by the one or more processing circuits, the object of the image into the one of one or more classes of interest via the ANN comprises deactivating the neuron activations of the one or more foreign classes.

4. The method of claim 1, wherein classifying, by the one or more processing circuits, the object of the image into the one of the one or more classes of interest via the ANN comprises performing a single forward pass of the ANN.

5. The method of claim 4, wherein classifying, by the one or more processing circuits, the object of the image into the one of the one or more of classes of interest via the ANN comprises:
  performing the single forward pass of the ANN;
  pausing the single forward pass after determining the neuron activations of the neurons of the ANN for the one or more foreign classes and the one or more classes of interest;
  subtracting the one or more of the neuron activations of the one or more foreign classes from the neuron activations of the one or more classes of interest; and
  resuming the single forward pass to classify the object of the image into the one of the one or more classes of interest.

6. The method of claim 1, wherein subtracting the one or more of the neuron activations of the one or more foreign classes from the neuron activations of the one or more classes of interest comprises adjusting at least one particular neuron activation of each of the one or more classes of interest to a value of a maximum of:
  zero; and
  the particular neuron activation minus a summation of the one or more of the neuron activations for the one or more foreign classes.

7. The method of claim 6, wherein the neuron activations of the one or more foreign classes are neuron activations for one or more foreign class feature maps, each of the one or more feature class maps being a foreign class feature map for one of the one or more foreign classes;
  wherein the neuron activations of the one or more classes of interest are neuron activations for one or more class of interest feature maps, each of the one or more class of interest feature maps being an class of interest feature map for one of the one or more classes of interest.

8. The method of claim 7, wherein the one or more foreign class feature maps and the one or more object of interest class feature maps are each a matrix of neuron activations of a predefined length and a predefined width;
  wherein the summation of the one or more of the neuron activations for the one or more foreign classes are a summation of a neuron activation of each matrix of each of the one or more foreign class feature maps at a particular length value and a particular width value, wherein the particular neuron activation of the class of interest is at the particular length value and the particular width value of one of the class of interest feature maps.

9. The method of claim 1, wherein the method further comprises:
  receiving, by the one or more processing circuits, a plurality of images, wherein the plurality of images comprise images of foreign objects of the one or more foreign classes and images of objects of the one or more classes of interest; and
  training, by the one or more processing circuits, the ANN based on the images of the foreign objects of the one or more foreign classes and the images of the one or more classes of interest.

10. The method of claim 9, wherein the images of the foreign objects of the one or more foreign classes do not include pixels related to the objects of the one or more classes of interest;
  wherein the images of the objects of the classes of interest do not include pixels related to the objects of the foreign objects of the one or more foreign classes.

11. The method of claim 10, wherein the foreign classes and the classes of interest comprise different classes.

12. A classification system for classifying an object of an image that is partially occluded by a foreign object, the system comprising a processing circuit configured to:
  receive the image of the object that is partially occluded by the foreign object; and
  classify the object of the image into one of one or more classes of interest via an artificial neural network (ANN) by:
    determining a plurality of neuron activations of neurons of the ANN for one or more foreign classes and the one or more classes of interest;
    subtracting one or more of the neuron activations of the one or more foreign classes from the neuron activations of the one or more classes of interest, wherein the foreign object belongs to one of the one or more foreign classes; and
    classifying the object of the image into the one of the one or more classes of interest based on the subtracting.

13. The system of claim 12, wherein the processing circuit is configured to classify the object of the image into the one of one or more classes of interest via the ANN by deactivating the neuron activations of the one or more foreign classes.

14. The system of claim 12, wherein the processing circuit is configured to classify the object of the image into the one of the one or more classes of interest via the ANN by performing a single forward pass of the ANN.

15. The system of claim 14, wherein the processing circuit is configured to classify the object of the image into the one of the one or more of classes of interest via the ANN by:

pausing the single forward pass after determining the neuron activations of the neurons of the ANN for the one or more foreign classes and the one or more classes of interest;

subtracting the one or more of the neuron activations of the one or more foreign classes from the neuron activations of the one or more classes of interest; and resuming the single forward pass to classify the object of the image into the one of the one or more classes of interest.

16. The system of claim 12, wherein subtracting the one or more of the neuron activations of the one or more foreign classes from the neuron activations of the one or more classes of interest comprises adjusting at least one particular neuron activation of each of the one or more classes of interest to a value of a maximum of:

zero; and the particular neuron activation minus a summation of the one or more of the neuron activations for the one or more foreign classes.

17. The system of claim 16, wherein the neuron activations of the one or more foreign classes are neuron activations for one or more foreign class feature maps, each of the one or more feature class maps being a foreign class feature map for one of the one or more foreign classes;

wherein the neuron activations of the one or more classes of interest are neuron activations for one or more class of interest feature maps, each of the one or more class of interest feature maps being an class of interest feature map for one of the one or more classes of interest.

18. The system of claim 17, wherein the one or more foreign class feature maps and the one or more object of interest class feature maps are each a matrix of neuron activations of a predefined length and a predefined width;

wherein the summation of the one or more of the neuron activations for the one or more foreign classes are a summation of a neuron activation of each matrix of each of the one or more foreign class feature maps at a particular length value and a particular width value, wherein the particular neuron activation of the class of interest is at the particular length value and the particular width value of one of the class of interest feature maps.

19. A device for training an artificial neural network (ANN) and classifying an object of an image that is partially occluded by a foreign object with the trained ANN, the device comprising a processing circuit configured to:

receive a plurality of images, wherein the plurality of images comprise images of foreign objects of one or more foreign classes and images of objects of one or more classes of interest;

train the ANN based on the images of the foreign objects of the one or more foreign classes and the images of the one or more classes of interest;

receive, the image of the object that is partially occluded by the foreign object; and classify the object of the image into one of one or more classes of interest via the ANN by:

determining a plurality of neuron activations of neurons of the ANN for one or more foreign classes and the one or more classes of interest;

subtracting one or more of the neuron activations of the one or more foreign classes from the neuron activations of the one or more classes of interest, wherein the foreign object belongs to one of the one or more foreign classes; and classifying the object of the image into the one of the one or more classes of interest based on the subtracting.

20. The device of claim 19, wherein the images of the foreign objects of the one or more foreign classes do not include pixels related to the objects of the one or more classes of interest;

wherein the images of the objects of the classes of interest do not include pixels related to the objects of the foreign objects of the one or more foreign classes.

* * * * *